US012571694B2

(12) United States Patent
Roos et al.

(10) Patent No.: US 12,571,694 B2
(45) Date of Patent: Mar. 10, 2026

(54) SENSOR DEVICE AND METHOD FOR DETERMINING A RELATIVE ANGULAR POSITION BETWEEN SHAFT HALVES OF A ROTARY SHAFT

(71) Applicants: NM Numerical Modelling GmbH, Zug (CH); Maglab AG, Basel (CH)

(72) Inventors: Markus Roos, Baar (CH); Javier Bilbao, Mannedorf (CH)

(73) Assignees: NM Numerical Modelling GmbH, Zug (CH); maglab AG, Basel (CH)

( * ) Notice: Subject to any disclaimer, the term of this patent is extended or adjusted under 35 U.S.C. 154(b) by 339 days.

(21) Appl. No.: 18/314,632

(22) Filed: May 9, 2023

(65) Prior Publication Data

US 2023/0358626 A1     Nov. 9, 2023

(30) Foreign Application Priority Data

May 9, 2022     (EP) ..................................... 22172347

(51) Int. Cl.
*G01L 3/10*          (2006.01)
(52) U.S. Cl.
CPC ..................................... *G01L 3/101* (2013.01)
(58) Field of Classification Search
CPC ........... G01L 3/101; G01L 3/104; G01B 7/30; G01D 5/2452
See application file for complete search history.

(56) References Cited

U.S. PATENT DOCUMENTS

| | | | |
|---|---|---|---|
| 6,935,193 B2 | 8/2005 | Heisenberg et al. | |
| 7,637,020 B2 * | 12/2009 | Maier ................... | G01D 5/145 |
| | | | 33/1 PT |
| 8,085,036 B2 * | 12/2011 | Ausserlechner ..... | G01D 5/2451 |
| | | | 324/207.25 |

(Continued)

FOREIGN PATENT DOCUMENTS

| | | | | |
|---|---|---|---|---|
| EP | 3385678 A1 | 10/2018 | | |
| JP | 2002107112 A * | 4/2002 | ............. | G01L 5/221 |

(Continued)

OTHER PUBLICATIONS

Extended European Search Report for EP 22172347.1 dated Oct. 25, 2022, European Patent Office, Munich Germany.

*Primary Examiner* — Octavia Hollington
(74) *Attorney, Agent, or Firm* — Michael Best & Friedrich LLP

(57)          ABSTRACT

A device and a method for determining a relative angular position between a first shaft half and a second shaft half of a rotary shaft, including: a first magnetic structure and a second magnetic structure having spatially different magnetic periodicities, wherein the first magnetic structure is mounted on the first shaft half and the second magnetic structure is mounted on the second shaft half such that respective magnetic fields generated by the first and second magnetic structures superpose, at least four sensors mounted stationary with respect to a rotary movement of the rotary shaft such that the superposed magnetic field is detectable by each of the stationary sensors, and an electronic evaluation circuit configured to receive measurement values corresponding to the superposed magnetic field from each of the sensors to determine the relative angular position from the received measurement values.

14 Claims, 6 Drawing Sheets

(56)                    References Cited

U.S. PATENT DOCUMENTS

|  |  |  |  |  |
|---|---|---|---|---|
| 8,218,134 | B2 * | 7/2012 | Al-Rawi | G01L 3/12 |
|  |  |  |  | 356/139 |
| 10,088,337 | B2 * | 10/2018 | Schroeder | F16C 41/007 |
| 10,488,225 | B2 * | 11/2019 | Ausserlechner | G01D 5/145 |
| 10,557,722 | B2 * | 2/2020 | Roos | H02K 11/215 |
| 10,571,302 | B2 * | 2/2020 | Vandersteegen | G01D 5/04 |
| 11,353,526 | B2 * | 6/2022 | Antoku | G01D 5/24485 |
| 2004/0015307 | A1 | 1/2004 | Heisenberg |  |
| 2014/0232378 | A1 * | 8/2014 | Ludwig | G01R 33/02 |
|  |  |  |  | 324/207.13 |

FOREIGN PATENT DOCUMENTS

| JP | 2003083823 | A | * | 3/2003 | B62D 15/0215 |
|---|---|---|---|---|---|
| WO | 2003081182 | A1 |  | 10/2003 |  |
| WO | 2014029885 | A1 |  | 2/2014 |  |

* cited by examiner

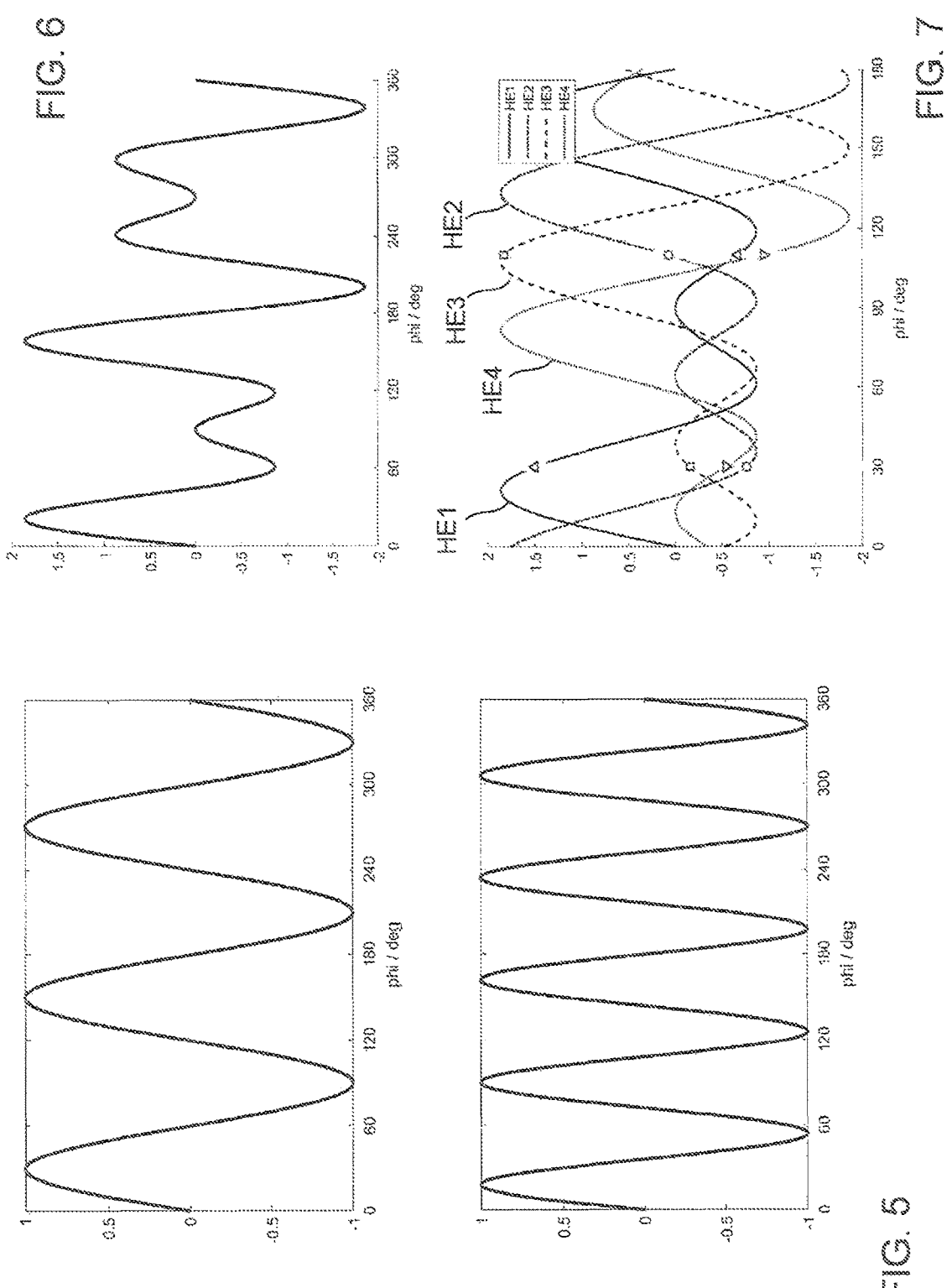

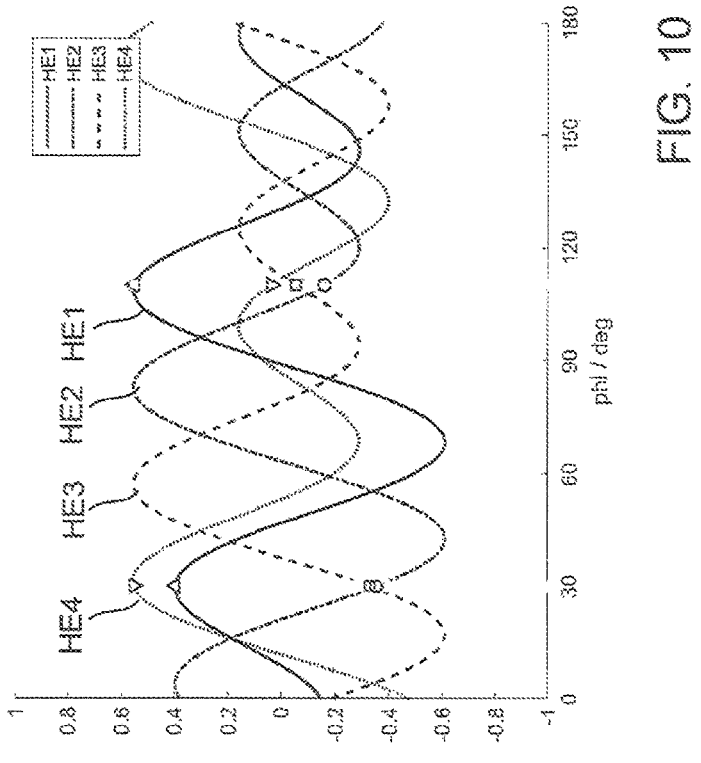
FIG. 10
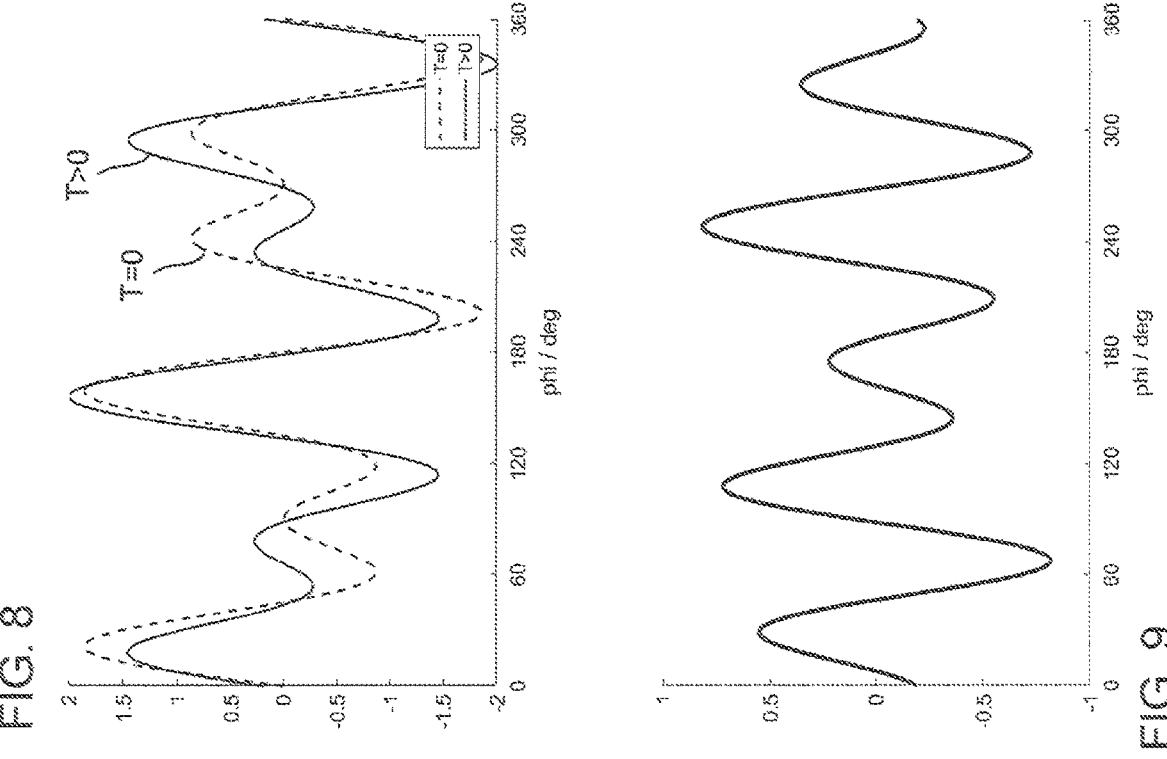
FIG. 8
FIG. 9

SENSOR DEVICE AND METHOD FOR DETERMINING A RELATIVE ANGULAR POSITION BETWEEN SHAFT HALVES OF A ROTARY SHAFT

TECHNICAL FIELD

The present disclosure relates to a sensor device for determining a relative angular position between shaft halves of a rotary shaft, for example a rotary motor drive shaft. The present disclosure further relates to a method for determining a relative angular position between shaft halves of such a rotary shaft.

BACKGROUND

Sensor devices for determining a (angular) position of a rotating or linearly moving position indicator are generally known, in which the position information to be obtained is represented by sine and cosine shaped varying raw sensor signals. Possible implementations include for example the measurement of magnetic field components of a magnetic induction field of a permanent magnet at suitable locations in space. The searched position information may be obtained by applying the arctangent to the measured sine and cosine shaped sensor signal values. These prerequisites severely restrict possible arrangements of sensor elements and the position indicator, and in particular require a high degree of accuracy in their production or the relative positioning of the sensor chip and the position indicator, respectively.

A fundamental difficulty with these methods is that a non-ideal arrangement of the position indicator and the sensor chip leads to distortions of the raw signals, namely that these no longer have the pure sine and cosine shape and thus lead to an inaccurate determination of the position.

Furthermore, in many instances, a position sensing device is responsive to external fields, e.g., magnetic fields generated by current-carrying conductors, stray magnetic fields of other/neighboring magnetic components, the earth's magnetic field, and the like. Without countermeasures, these additional field components cannot be distinguished from the useful field so that the external fields restrict the accuracy of the position measuring device.

Moreover, a fundamental challenge for position measuring devices is their long-term stability, i.e., an initially sufficiently accurate calibration of the dynamic system changes over time, e.g., by mechanical displacement of the components relative to one another or by drifting of electronic sensor properties. A fault-tolerant device and method for ascertaining the measurement quality of such dynamic physical systems during normal operation are described in U.S. Pat. No. 10,557,722 B2, which is incorporated herein in its entirety by reference, thus improving the long-term stability of such measuring devices. The proposed solution for determining the position of a position indicator was based on the finding that the sensor measurement values supplied by the sensors can be represented as a measurement vector, i.e. as a point in a vector space, the dimension of which corresponds to the number of sensors, and that the measurement vectors generated during the movement of the position indicator (rotation about an axis of rotation or displacement along an axis) lie on a path or orbit in this vector space. This orbit can—under ideal conditions—be projected onto a circle or a circular arc by means of a linear mapping, i.e., each position of the position indicator corresponds to a point on the orbit in the abstract space of the signal vectors which is unambiguously assigned to a point on the circle or arc. Non-ideal conditions, for example non-ideal properties of the position indicator, which can be particularly the case with magnets, or a drift over lifetime of sensors or the use of non-optimally selected calibration positions, cause deviations from the circular shape. The linear mapping can be represented as a matrix-vector operation and can be determined using standard methods of linear algebra. Each measurement vector is projected onto a 2-component pointer vector, the tip of which approximates a circular arc, wherein the direction of the 2-component vector corresponds to the position of the position indicator.

Although the proposed solution already enables very satisfactory applications, there is a need for a further increase in the accuracy of the position determination in order to be able to open up those applications in which the (angular) positions to be determined are very small (e.g. motor drive shaft applications), such as for an angular range of about 1° to 2° or below and/or for an angular resolution of a fraction of about 1°, e.g. fractions of a hundredth or smaller.

Accordingly, there is a need for a sensor device and a method for determining a relative angular position between shaft halves of a rotary shaft, the device and method being distinguished by improved performance, where performance is assessed inter alia on the qualities of operational robustness, numerical precision, long-term stability, application flexibility, and production/implementation ease and cost.

SUMMARY

It is an object of the present disclosure to provide a sensor device and method for determining a relative angular position between shaft halves of a rotary shaft, e.g., a rotary motor drive shaft, which each ensure high operational robustness and long-term stability, for example low susceptibility to interference due to noise, temperature, and external fields such as those mentioned herein, and accurate measurement results. In addition, the device and method shall provide fault detection and quantitative error detection. The adaptability of the device and method to different use cases and requirements shall also be improved, and the complexity and cost of manufacturing and implementation be reduced, for example by allowing standard signal processing hardware to be used.

The present disclosure is defined by the independent claims. The dependent claims define advantageous embodiments.

It is to be noted that the individual features listed in the description below can be combined in any technically meaningful way with each other (also across different categories, e.g., apparatus and method) and show further embodiments of the present disclosure. The description of the disclosed embodiments is additionally characterized and specified particularly in connection with the figures.

Furthermore, it is to be understood that the term "and/or" or the expressions "at least one of" or "one or more of", if used herein in order to combine a first and a second feature, are to be construed as disclosing a first embodiment that comprises only the first feature, a second embodiment that comprises only the second feature, and a third embodiment that comprises both the first feature and the second feature. If more than two features are listed, also any combinations thereof are to be construed as disclosed embodiments according to the present disclosure.

Still further, the terms "approximately", "essentially", or "about" indicate a range of tolerance which the skilled person in the field in question considers to be normal. In particular, the afore-mentioned terms are to be understood as encompassing a tolerance range of the referred quantity of up to a maximum of +/−20%, preferably up to a maximum of +/−10%.

The present disclosure will be described with respect to particular embodiments and with reference to certain drawings, but the disclosed embodiments are not limited thereto but only by the claims.

The terms first, second, and the like in the description and in the claims, are used for distinguishing between similar elements and not necessarily for describing a sequence, either temporally, spatially, in ranking or in any other manner. It is to be understood that the terms so used are interchangeable under appropriate circumstances and that the disclosed embodiments described herein are capable of operation in other sequences than described or illustrated herein.

Moreover, directional terminology such as top, bottom, front, back, leading, trailing, under, over, and the like in the description and the claims is used for descriptive purposes with reference to the orientation of the drawings being described, and not necessarily for describing absolute positions. Because components of embodiments of the present disclosure can be positioned in a number of different orientations, the directional terminology is used for purposes of illustration only, and is in no way intended to be limiting, unless otherwise indicated. It is, hence, to be understood that the terms so used are interchangeable under appropriate circumstances and that the embodiments described herein are capable of operation in other orientations than described or illustrated herein.

It is to be noticed that the term "comprising", used in the claims, should not be interpreted as being restricted to the means listed thereafter. It does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising features A and B" should not be limited to devices consisting only of features A and B. It means that with respect to the present disclosure, the only relevant features of the device are A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments, various features of the disclosed embodiments are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the disclosed embodiments require more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of present disclosure.

Furthermore, while some embodiments described herein include some but not other features included in other embodiments, combinations of features of different embodiments are meant to be within the scope of the present disclosure, and form different embodiments, as would be understood by those in the art. For example, in the following claims, any of the claimed embodiments can be used in any combination.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

According to an aspect, a sensor device for determining a relative angular position between a first shaft half and a second shaft half of a rotary shaft, e.g., a rotary motor drive shaft such as a rotary drive shaft of an e-bike crankset, includes:

a first magnetic structure and a second magnetic structure having spatially different magnetic periodicities, wherein the first magnetic structure is mounted on the first shaft half and the second magnetic structure is mounted on the second shaft half such that respective magnetic fields generated and/or influenced by the first and second magnetic structures superpose, at least four sensors (e.g. analog or digital sensing elements, e.g., Hall elements) mounted stationary with respect to a rotary movement of the rotary shaft such that the superposed magnetic field generated and/or influenced by the first and second magnetic structures is detectable by each of the at least four stationary sensors, and an electronic evaluation circuit (without limitation, e.g., a microcontroller, a digital signal processor, and the like) configured to receive measurement values corresponding to the detected superposed magnetic field from each of the at least four sensors in order to determine the relative angular position from the received measurement values of the at least four sensors.

The term "periodicity" refers to an integer fraction of 360° about an axis of rotation of the first and second shaft half, respectively. The magnetic field generated and/or influenced by the respective magnetic structure looks the same after the structure is rotated about said rotation axis over an angle equal to said integer fraction, e.g., 180° in case of a 4-pole magnet, 120° in case of a 6-pole magnet, etc. The field of such a magnetic structure may also be called a rotationally symmetric field.

The magnetic structure according an embodiment may generate the respective magnetic field itself, for example, using a magnet such as a permanent magnet or a coil through which an electric current may flow. In this case, the magnet may also be considered an integral part of the magnetic structure since the magnet may form or at least be a portion of the body of the magnetic structure.

Additionally, or alternatively, the magnetic structure may (only) influence (e.g., guide, concentrate, and the like) the magnetic field generated by a magnet, whether the magnet is an integral part of the magnetic structure or a magnet externally disposed with respect to the body of the magnetic structure.

In any case, according to an embodiment, the arrangement of the non-rotating sensors and the two magnetic structures, which co-rotate with their respective shaft halves, is such that the magnetic fields generated and/or influenced by each of the two magnetic structures are superposed at the location of each sensor and the resulting superposed magnetic field can be detected by the sensors in each case. From the superposed magnetic fields at the locations of each of the at least four stationary sensors the relative angular position between both shaft halves may be accurately determined.

The disclosed embodiments successfully overcome the previous obstacle to measure simultaneously two fields of both structures and distinguish them in order to extract from a same measurement set the relative angular position between both shaft halves.

In general, the sensors may be configured to detect an arbitrary field component of the superposed magnetic field.

Additionally, or alternatively, at least some of the sensors may be configured to detect a field gradient of the superposed magnetic field in an arbitrary spatial direction. For example, the field gradient may be detected by a single sensor such as an analog Hall element to minimize information loss due to cancellation by subtracting similar values after analog-to-digital conversion (ADC).

All or some of the sensors may detect the superposed magnetic field in the same spatial direction, i.e., detect a same field component or field gradient of the superposed magnetic field, e.g., in the direction of rotation of the rotary shaft (tangential direction with respect to the rotary shaft), or in the axial direction of the rotary shaft, or in the radial direction of the rotary shaft, for example.

At least some of the sensors may be configured to detect the superposed magnetic field in different directions, i.e., detect different field components or field gradients of the superposed magnetic field, e.g., in the radial and/or the axial and/or the tangential direction with respect to the rotary movement of the rotary shaft.

The disclosed embodiments optimally use the information present in the sensor signals to provide said angular information. Even only small angle differences of the rotating shaft halves may be efficiently detected by variations of the superposed magnetic fields generated and/or influenced by the respective magnetic structures. To this end, the disclosed embodiments essentially only needs three main components: two magnetic structures generating and/or influencing a respective magnetic field, and a stationary arrangement of at least four sensors, such as and without limitation a single printed circuit board (PCB) on which the sensors are mounted. In turn, the PCB may be stationarily attached to a stator (e.g., housing) accommodating the rotary shaft. Additionally, the PCB may be used to electrically connect the sensors to the evaluation circuit, e.g., a microcontroller, a digital signal processor, and the like. The evaluation circuit may be mounted on the same PCB as the sensors, which enables an even more compact and lighter design that can be used to particular advantage, for example, in small-scale applications such as e-bike applications (e.g., crankset), and generally in drive systems that particularly benefit from a compact design package and low weight, such as in (electric) automotive applications.

While previously known solutions use two sensors measuring the magnetic field of a first magnet (or magnetic structure) and two further sensors measuring the magnetic field of another, second magnet (or magnetic structure), the present disclosure proposes to measure the superposed magnetic field at the locations of each sensor. Thus, the crosstalk between the magnets/magnetic structures that previous solutions try to avoid or suppress is not a leakage/stray loss/noise in the signal. The device according to an embodiment may have a highly compact design since both magnetic structures may be arranged very close to each other. Preferably, the spacing between both magnetic structures may be less than about 30 mm, more preferably less than about 20 mm, or less than about 10 mm. Even more compact designs may be achieved when arranging the magnetic structures with a spacing therebetween of preferably less than about 5 mm, or even less than about 3 mm. Since the disclosed embodiments successfully overcome the previously existing hindrance to measure simultaneously two fields of both magnetic structures at the respective locations of the sensors in each case and extract from a same measurement set the desired information, such as the relative angular position between both shaft halves for example, these close arrangements of the two magnetic structures are made possible.

The sensors may be mounted stationary between the two magnetic structures or radially outward to them. In the first case, the sensors maybe mounted at radial locations with respect to the rotary shaft being smaller than the radial dimensions of the magnetic structures. In the second case, the sensors may be mounted at radial distances from the rotary shaft being larger than the radial dimension of at least one of the magnetic structures. Moreover, the sensors may be mounted at the same radial distances from the rotary shaft or at different radial positions. The sensors also may be mounted in a same plane perpendicular to the axis of the rotary shaft, may be mounted in a same plane parallel to the axis of the rotary shaft.

The device according to an embodiment provides high design/constructional flexibility, since, inter alia, any type of raw sensor signals related to the (moving, distorted) superposed magnetic field to be measured can be adopted, i.e., any spatial field component and/or field gradient. The measurement may take place in any position such as in-plane or out-of-plane. The number of sensors is not necessarily limited upwards, i.e., it may be larger than the minimum of four sensors. More than four sensors may provide an even higher accuracy and may be used to cancel or suppress noise at the theoretical limit. Among other things, this also ensures high operational robustness, low susceptibility to noise, temperature, external fields, fault detection, quantitative error detection and the like, so that accurate measurement results may be provided. After the device has been mounted, a one-time calibration procedure may take care of specimen variations due to magnets and mounting tolerances. This provides an optimal differentiation of the structure (e.g., magnetization pattern) as well as geometrical imperfections of the shaft halves and relative sensor arrangement (e.g., axis tilt, off-axis position, and the like).

It should be noted that sensors measuring the same information do not contribute to the total number of sensors in the sense of the minimum four sensors according to an embodiment.

The information contained in the sensor measurements of the superposed magnetic field at the locations of the individual sensors may preferably be extracted using a method described in more detail below and/or disclosed, for example, in U.S. Pat. No. 10,557,772 B2 of the same applicant.

According to advantageous embodiments of the present disclosure, the rotary shaft comprises a torsion section elastically interconnecting the two shaft halves for torque transmission. The torsion section may be a torsion bar, for example. Knowing the torsional sensitivity of the torsion section, i.e., the torsion angle as a function of the applied mechanical torque, which may be obtained by a (e.g., one-time) calibration procedure, for example, the torque transmitted by the rotary shaft results directly from the determined relative angular position between the two shaft halves of the rotary shaft. Since small relative angular positions may be determined with high accuracy as described herein, precise torque measurements are made possible which are of particular advantage in small-scale application such as e-bike applications, for example. The present disclosure optimally uses the information present in the sensor signals to provide the torque. This torque information is only implicitly contained in the various individual sensor signals (i.e., measurement values). If the device uses more than four sensors, constructive and/or component imperfections may be screened, and signal noise may be suppressed at the theoretical limit.

According to yet further advantageous embodiments of the present disclosure, the electronic evaluation circuit is further configured to determine an absolute angular position of the rotary shaft (i.e., the first shaft half or the second shaft half, or both) in relation to a predetermined rotary reference position from the received measurement values of the at least four sensors. This is made possible by the different magnetic periodicities of the first and second magnetic structures and the superposition of the respectively generated and/or influenced magnetic fields at the locations of the respective sensors. The magnetic field superimposed at the location of the sensors according to an embodiment allows unambiguous detection of the absolute angular position (i.e., absolute angle) of rotation of the rotary shaft throughout a full revolution (i.e., 360°). The disclosed embodiments successfully overcome the previous obstacle to measure simultaneously two fields of both magnetic structures and distinguish them in order to extract from a same measurement set the absolute angle of rotation of the rotary shaft.

According to further advantageous embodiments of the present disclosure, the at least four sensors mounted stationary with respect to the rotary movement of the rotary shaft define at least one virtual sensing line with respect to said rotary movement, and wherein a Fourier series of the magnetic field generated and/or influenced by the first magnetic structure along said at least one virtual sensing line contains at least a first maximum harmonic and a Fourier series of the magnetic field generated/or influenced by the second magnetic structure along said at least one virtual sensing line contains at least a second maximum harmonic different from said first maximum harmonic. "First" and "Second" harmonic indicate the association of the respective harmonics with the first and second magnetic structures, respectively. The term "maximum" may refer to a maximum amplitude or maximum spectral weight of the respective harmonics (which correspond to a given number n, m of poles/pole pairs associated with the respective first/second magnetic structure for establishing the magnetic periodicities) within a set of possibly a plurality of detectable harmonics. In principle, any different harmonics (i.e., of higher or lower degree than n or m) may be used, provided that some degradation in the accuracy of the values to be determined and more noise is going to be accepted. In any case, the magnetic periodicities of the first magnetic structure and the second magnetic structure along said at least one virtual sensing line are different, which enables determination of the relative angular position and/or transmitted torque between the first and second magnetic structures and/or absolute angular position of the rotary shaft in the accurate manner disclosed herein.

In particular, for the determination of an absolute angular position of the rotary shaft, the first maximum-amplitude harmonic and the second maximum-amplitude harmonic (which correspond to a given number n, m of poles/pole pairs of the first and second magnetic structures for establishing the respective magnetic periodicities) differ such that their degrees are coprime or relative prime integers, i.e., the only positive integer that is a divisor is 1. For example, coprime number pairs n, m may be 3 and 5, 4 and 5, 5 and 7, 7 and 8, 8 and 11, 11 and 13, etc. Then, even if the magnetic periodicity of the individual magnetic structure only allows up to multiples of 360°/n and 360°/m, respectively, an absolute angular position of the rotary shaft with respect to a predetermined rotary reference position can be reliably determined with high accuracy.

The virtual sensing line may have a substantially circular shape which allows for a compact design and simple arrangement/mounting of the sensors. Although the circular shape is considered particularly preferred, other geometric shapes are conceivable as well.

According to still other advantageous embodiments, the first and second magnetic structures may comprise different pole configurations for providing different periodicities. For example, the first and second magnetic structures may comprise different numbers of magnets, e.g., permanent magnets or coils. The magnets may be axially or radially magnetized. There may be one magnet axially magnetized, or a coil with its longitudinal axis oriented along the axis, and optionally centered at the axis.

According to other preferred embodiments the permanent magnets may be arranged according to a Halbach array. A Halbach array is a special arrangement of permanent magnets that augments the magnetic field on one side of the array while cancelling the field to near zero on the other side. This is achieved by having a spatially rotating pattern of magnetization. A particular rotating pattern of magnetization may be used to precisely and efficiently define the magnetic periodicity generated and/or influenced by the respective magnetic structure the respective permanent magnets are associated to. Moreover, the Halbach magnetization pattern allows the sensor measurements (i.e., measurement values) to not contain large higher harmonics, further improving the quality of the results (i.e., determination of the relative angular position, or torque, or absolute angular position, or any combination thereof, from the measurement values). The arrangement may be so that the magnetic field is maximum between the magnetic structures (e.g., axial direction) or radially thereto, depending on the specific location of the sensors.

Still other preferred embodiments provide that a number n of poles or pole pairs of the first magnetic structure and a number m of poles or pole pairs of the second magnetic structure are coprime or relative prime integers, i.e., the only positive integer that is a divisor of the number of poles/pole pairs of the first magnetic structure and the number of poles/pole pairs of the second magnetic structure is 1. In other words, their greatest common divisor (GCD) is 1. For example, coprime numbers n, m of the poles/pole pairs for the respective magnetic structures may be 3 and 5, 4 and 5, 5 and 7, 7 and 8, 8 and 11, 11 and 13, etc. This configuration may be used to particular advantage for determining an absolute angular position of the rotary shaft with respect to a predetermined rotary reference position, even if the magnetic periodicity of the individual magnetic structure only allows up to multiples of 360°/n and 360°/m, respectively.

According to further embodiments, the sensors may be spaced apart from each other with respect to the rotary movement of the magnetic structures at intervals different from the magnetic periodicity of the first and/or second magnetic structure(s) or a rational number thereof. In other words, the stationary sensors are not mounted at locations coinciding with the n- and m-polar rotational symmetry of the magnetic structures, i.e., are not placed with angular intervals of $k \cdot 2\pi/n$ or $j \cdot 2\pi/m$, ($k=1, \ldots, n-1, j=1, \ldots, m-1$, wherein n=number of poles/pole pairs of the first magnetic structure, and m=number of poles/pairs of the second magnetic structure). In this way, the information about the relative and/or absolute angular position of the magnetic structures is acquired by the sensors in the most accurate way.

According to still further advantageous embodiments of the present disclosure, the evaluation circuit is configured to determine the relative angular position, or torque, or absolute angular position based on a multiplication between the received measurement values and a predetermined signal model matrix representative of the measurement process of the sensor device on the relative angular position, and torque, and absolute angular position, respectively. In other words, the model matrix describes the sensing/measuring process of the underlying dynamic physical system, i.e., the components of the sensor device such as the magnetic structures, mounting/positioning of magnets/coils, mounting/positioning of the sensors etc. The information thereof may be obtained in an additional calibration process of the sensor device which may be performed once before the first operation of the sensor device. From this calibration process, the signal model and characteristics of possibly present higher harmonics may be identified.

The model matrix comprises row and column entries, wherein each row relates to the sense signal of one sensor (i.e., the number of rows may equal the total number of different sensors) and the corresponding row entries may refer to components of considered harmonics. From information gathered at the calibration phase of the sensor device, the model matrix and the characteristics of (possibly present) higher harmonics may be identified.

According to still further advantageous embodiments of the present disclosure, the electronic evaluation circuit is further configured to determine an error signal based on a multiplication between the received measurement values and a predetermined coefficient matrix representative of an error on the determined relative angular position or torque or absolute angular position, or any combination thereof. The error signal/error information may be output to further process it. For example, the error signal/information may be output quantitatively in analog or digital form or compared to a predetermined threshold to set an error flag.

Further advantageous embodiments of the present disclosure provide that the evaluation circuit is further configured to receive at least five sensor signals and to determine the relative angular position, or the torque, or the absolute angular position, or any combination thereof, by calculating a subspace of the sensor signals that is immune to external magnetic fields such as magnetic fields generated by current-carrying conductors, stray magnetic fields of other/neighboring magnetic components, the earth's magnetic field, etc.

According to still further embodiments of the present disclosure five or six sensors are provided to detect the superposed magnetic field in a same spatial axis, or six or seven sensors are provided to detect the superposed magnetic field in two different directions within a same plane, or seven or eight sensors are provided to detect the superposed magnetic field in three different spatial directions.

It is to be noted that, in the sense of the present disclosure, in the event the sensors are measuring the magnetic field in different directions, a single package sensor (such as one SMD package, for example) measuring the field at the same location but in different directions may count as multiple sensors. For example, a bidirectional sensor package in one physical location, is to be interpreted as two sensors/sensor elements.

According to still further advantageous embodiments of the present disclosure, at least two of the at least four sensors are arranged virtually at a same location or in a same packaging. For example, the sensors may be accommodated in the same housing. The sensors may be configured to detect the superposed magnetic field (i.e., field component or field gradient) in the same spatial direction or in different spatial directions. Redundant sensor signals, i.e., detecting the superposed magnetic field in the same spatial direction at the same location for example, may be used for error detection.

Other advantageous embodiments provide that at least two of the at least four sensors are configured to detect the superposed magnetic field in different directions, i.e., detect different field components or field gradients of the superposed magnetic field.

At least two of the at least four sensors may be at least partially surrounded by the magnetic structures. For example, said sensors may be arranged in a mirror or symmetry plane between the first and second magnetic structures, i.e., interposed in a space between two opposing magnetic structures such that at least two sides or side faces of the sensors and at least one of the magnetic structures stand vis-à-vis.

Alternatively, at least two of the at least four sensors may be arranged laterally of the magnetic structures, not being surrounded by one or both of the magnetic structures.

It should be clear from the above that the sensors may output a first angle/angular value, or a second angle/angular value, or a torque value, or an error flag, or an error signal etc.

According to another aspect of the present disclosure, a method for determining a relative angular position between a first shaft half and a second shaft half of a rotary shaft, in particular a rotary motor drive shaft, comprises at least the steps of:

providing a first magnetic structure and a second magnetic structure having spatially different magnetic periodicities, wherein the first magnetic structure is mounted on the first shaft half and the second magnetic structure is mounted on the second shaft half such that respective magnetic fields generated and/or influenced by the first and second magnetic structures superpose, providing at least four sensors mounted stationary with respect to a rotary movement of the rotary shaft such that the superposed magnetic field generated and/or influenced by the first and second magnetic structures is detected by each of the at least four stationary sensors, and, by an electronic evaluation circuit, receiving measurement values corresponding to the detected superposed magnetic field from each of the at least four sensors and determining the relative angular position from the received measurement values of the at least four sensors.

It is to be noted that with respect to the effects and advantages of the features regarding the method disclosed herein, reference is made in its entirety to the corresponding, analogous features of the sensor device as well as its effects and advantages disclosed herein. Therefore, features of the sensor device disclosed herein shall be regarded also as features applicable for the definition of embodiments of the method according to the disclosed embodiments unless explicitly stated otherwise. Likewise, features of the method disclosed herein shall be regarded also as features applicable for the definition of embodiments of the sensor device according to the present disclosure unless explicitly stated otherwise. Hence, for the purpose of conciseness of this specification and an improved understanding of the principles of the present disclosure, a duplication of explanations of such analogous features, their effects and advantages may be omitted without any such omissions to be construed as limitations.

As with the sensor device, the information contained in the sensor measurements of the superposed magnetic field at the locations of the individual sensors may preferably be extracted using a method disclosed, for example, in U.S. Pat. No. 10,557,772 B2 of the same applicant.

It is to be understood that each of the magnetic fields may be generated by the respective magnetic structure, for example, using a magnet such as a permanent magnet or a coil through which an electric current may flow.

Additionally, or alternatively, the magnetic field generated by a magnet, or a coil may (only) be influenced (e.g., guide, concentrate, and the like) by the respective magnetic structure.

In any case, it should be emphasized that according to the present disclosure the magnetic fields generated and/or influenced by each of the two magnetic structures are superposed at the location of each sensor due to the arrangement of the non-rotating sensors and the two magnetic structures, which co-rotate with their respective shaft halves. The resulting superposed magnetic field can then be detected by the individual sensors.

Using the different magnetic periodicities of the first and second magnetic structures and superposing the respectively generated and/or influenced magnetic fields at the locations of the respective sensors, the relative angular position and additionally also an absolute angular position of the rotary shaft (i.e., the first shaft half or the second shaft half, or both) in relation to a predetermined rotary reference position may be determined from the received measurement values of the at least four sensors. In the latter case, the superposed magnetic field allows unambiguous detection of the absolute angular position (i.e., absolute angle) of rotation of the rotary shaft throughout a full revolution (i.e., 360°).

From the superposed magnetic fields at the locations of each of the at least four stationary sensors the relative angular position or an absolute angular position or a torque between both shaft halves may be accurately determined.

To this end, an arbitrary field component of the superposed magnetic field detected by the sensors may be selected.

Additionally, or alternatively, a field gradient of the superposed magnetic field in an arbitrary spatial direction may be detected by at least some of the sensors, e.g., in the direction of rotation of the rotary shaft. For example, the field gradient may be detected by a single sensor such as an analog Hall element to minimize information loss due to cancellation by subtracting similar values after analog-to-digital conversion (ADC).

Further according to embodiments of the present disclosure, the superposed magnetic field may be detected by all or some of the sensors in the same spatial direction, i.e., detecting only one predetermined field component or field gradient of the superposed magnetic field, e.g., in the direction of rotation of the rotary shaft.

Still according to further embodiments of the present disclosure, the superposed magnetic field may be detected by at least two of the sensors in different directions, i.e., detecting different field components or different field gradients of the superposed magnetic field, e.g., in the radial and/or the axial and/or the tangential direction with respect to the rotary movement of the rotary shaft.

The method may use more than four sensors to detect the superposed magnetic field at the locations of each sensor. This further improves the accuracy of the determined relative angular position, or absolute angular position, or torque, and may additionally be used to effectively cancel or suppress noise at the theoretical limit. It should be noted that sensors measuring the same information do not contribute to the total number of sensors in the sense of the minimum four sensors according to the present disclosure.

Furthermore, advantageous embodiments of the present disclosure may use at least five sensor signals and determine the relative angular position, or the torque, or the absolute angular position, or any combination thereof, by calculating a subspace of the sensor signals that is immune to external magnetic fields such as magnetic fields generated by current-carrying conductors, stray magnetic fields of other/neighboring magnetic components, the earth's magnetic field, etc.

According to yet other advantageous embodiments of the present disclosure, torque is transmitted between the two shaft halves via a torsion section which interconnects the shaft halves to one another in an elastic manner. The torsion section may be a torsion bar, for example. Knowing the torsional sensitivity of the torsion section, i.e., the torsion angle as a function of the applied mechanical torque, which may be obtained by a (one-time) calibration procedure, for example, the torque transmitted by the rotary shaft results directly from the determined relative angular position between the two shaft halves of the rotary shaft. Since small relative angular positions may be determined with high accuracy, precise torque measurements are made possible. The present disclosure optimally uses the information present in the sensor signals to provide the torque. This torque information is only implicitly contained in the various individual sensor signals (i.e., measurement values). If the method uses more than four sensors, constructive and/or component imperfections may be screened as well, and signal noise may be suppressed at the theoretical limit.

According to further advantageous embodiments of the present disclosure, the at least four sensors mounted stationary with respect to the rotary movement of the rotary shaft are mounted such that they define at least one virtual sensing line with respect to said rotary movement, and wherein a Fourier series of the magnetic field generated by the first magnetic structure along said at least one virtual sensing line contains at least a first maximum harmonic and a Fourier series of the magnetic field generated by the second magnetic structure along said at least one virtual sensing line contains at least a second maximum harmonic different from said first maximum harmonic. Again, "first" and "second" harmonic indicate the association of the respective harmonics with the first and second magnetic structures, respectively. The term "maximum" may refer to a maximum amplitude or maximum spectral weight of the respective harmonics (which correspond to a given number n, m of poles/pole pairs associated with the respective first/second magnetic structure for establishing the magnetic periodicities) within a set of possibly a plurality of detectable harmonics. In principle, any different harmonics (i.e., of higher or lower degree than n or m) may be used, provided that some degradation in the accuracy of the values to be determined and more noise is going to be accepted.

In particular, for the determination of an absolute angular position of the rotary shaft, the first maximum-amplitude harmonic and the second maximum-amplitude harmonic (which correspond to a given number n, m of poles/pole pairs of the first and second magnetic structures for establishing the respective magnetic periodicities) differ such that their degrees are coprime or relative prime integers, i.e., the only positive integer that is a divisor is 1. For example, coprime number pairs n, m may be 3 and 5, 4 and 5, 5 and 7, 7 and 8, 8 and 11, 11 and 13, etc. Then, even if the magnetic periodicity of the individual magnetic structure only allows up to multiples of 360°/n and 360°/m, respectively, an absolute angular position of the rotary shaft with respect to a predetermined rotary reference position can be reliably determined with high accuracy.

The sensors may be mounted along a substantially circular line which allows for a compact design and simple arrangement/mounting of the sensors. Although the circular shape is considered particularly preferred, other geometric shapes are conceivable as well.

Further embodiments of the present disclosure provide that the sensors may be spaced apart from each other with respect to the rotary movement of the magnetic structures at intervals different from the magnetic periodicity of the first and/or second magnetic structure(s) or a rational number thereof, as stated in more detail above.

It should be noted that the relative angular position, or torque, or absolute angular position may be determined based on a multiplication between the received measurement values and a predetermined signal model matrix representative of the measurement process of the sensor device on the relative angular position, and torque, and absolute angular position, respectively. Therefore, the model matrix describes the sensing/measuring process of the dynamic physical system, i.e., the components of the sensor device such as the magnetic structures, mounting/positioning of magnets/coils, mounting/positioning of the sensors etc. The information thereof may be obtained in an additional calibration process of the sensor device which may be performed once before the first operation of the sensor device. From this calibration process, the signal model and characteristics of possibly present higher harmonics may be identified.

The model matrix comprises row and column entries, wherein each row relates to the sense signal of one sensor (i.e., the number of rows may equal the total number of different sensors) and the corresponding row entries may refer to components of considered harmonics. From information gathered at the calibration phase of the sensor device, the model matrix and the characteristics of (possibly present) higher harmonics may be identified.

Other advantageous embodiments of the present disclosure provide that an error signal is determined based on a multiplication between the received measurement values and a predetermined coefficient matrix representative of an error on the determined relative angular position or torque or absolute angular position, or any combination thereof. The error signal/error information may be output to further process it. For example, the error signal/information may be output quantitatively in analog or digital form or compared to a predetermined threshold to set an error flag.

Still further according to embodiments of the present disclosure, the superposed magnetic field is detected by the sensors asynchronously, resulting in asynchronous measurement values, which are calculated back to a common point in time by interpolation prior to determining the relative angular position, or the torque, or the absolute angular position, or any combination thereof. This essentially improves the dynamic performance. Advantageously, for analog-to-digital conversion a multiplexed ADC may be used, which simplifies the hardware requirements.

The interpolation may preferably be based on FIR interpolation, however, without necessarily being limited thereto.

Alternatively, the superposed magnetic field may be detected by the sensors synchronously, resulting in synchronous measurement values.

It should be clear from the above that the sensors may output a first angle/angular value, or a second angle/angular value, or a torque value, or an error flag, or an error signal etc.

Further advantageous embodiments are defined below.

BRIEF DESCRIPTION OF THE DRAWINGS

These and other features and advantages of the various disclosed embodiments will be apparent from the following description of non-limiting embodiments of the present disclosure which will be elucidated below with reference to the drawing.

The drawings are only schematic, i.e., the size of some of the elements may be exaggerated and not drawn to scale for illustrative purposes. The absolute and relative dimensions do not necessarily correspond to actual reductions to practice of the disclosed embodiments.

Figure 2:
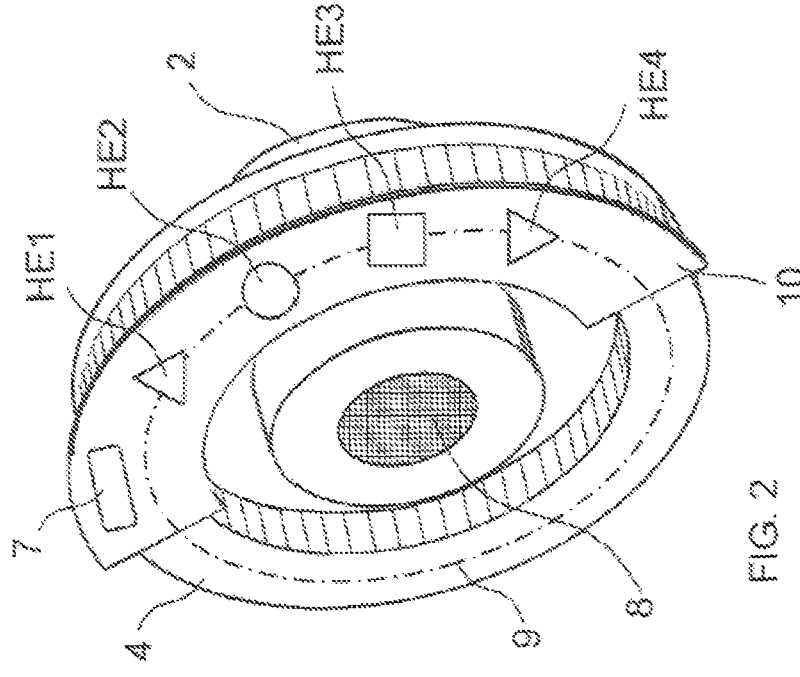

Any reference signs in the claims shall not be construed as limiting the scope.

Figure 1:
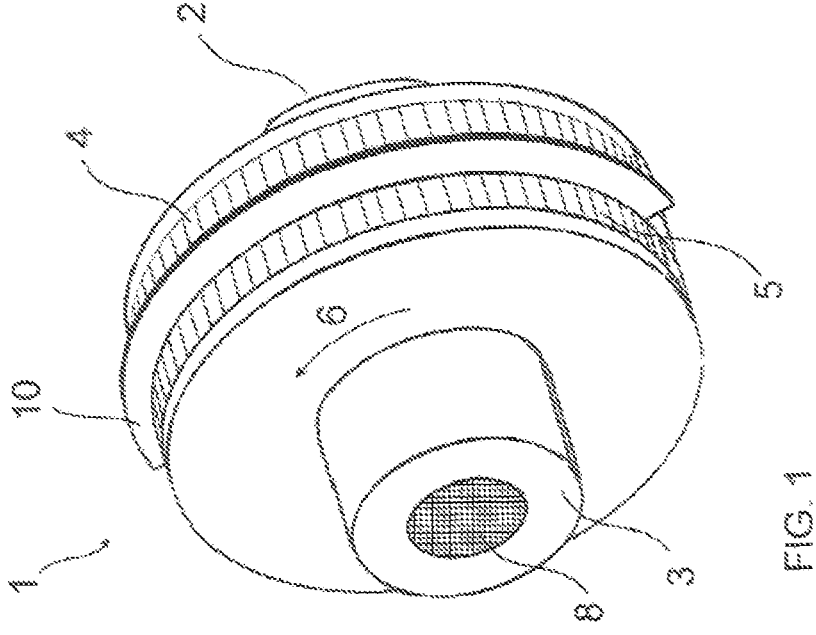

In the drawing, schematically:

FIG. 1 shows a perspective view of an exemplary embodiment of a sensor device according to an embodiment.

FIG. 2 shows a perspective view of a portion of the sensor device of FIG. 1.

Figure 3:
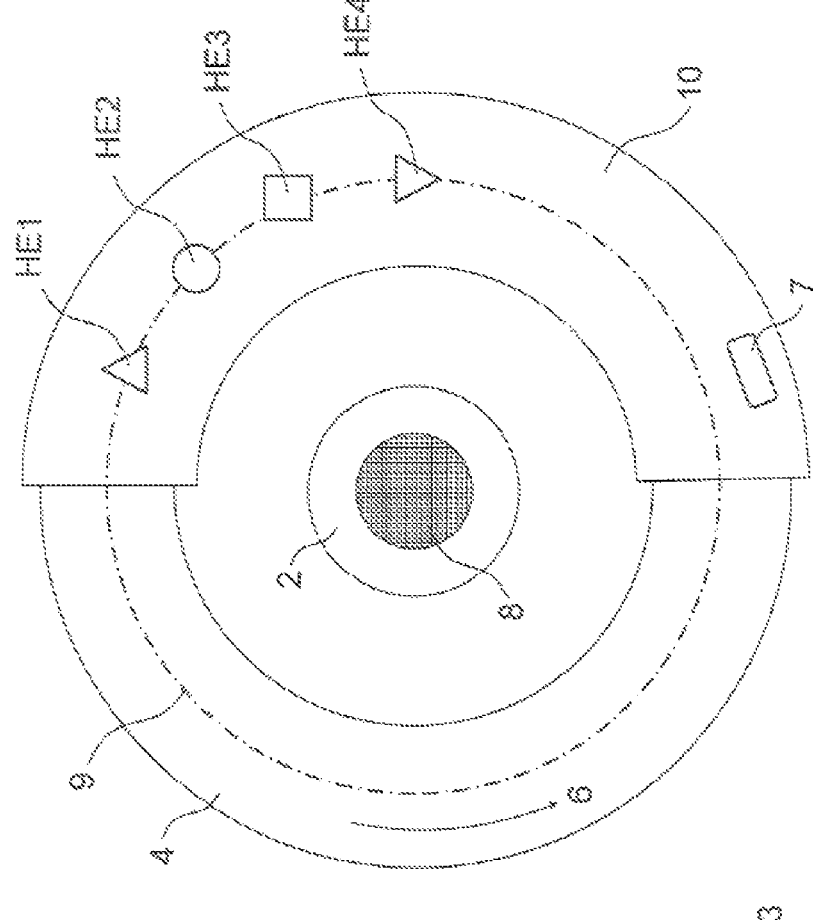

FIG. 3 shows a plan view of the sensor device of FIG. 2 in more detail.

FIG. 4 shows a graph of an exemplary first magnetization pattern of a magnetic structure.

FIG. 5 shows a graph of an exemplary second magnetization pattern of a magnetic structure.

FIG. 6 shows a graph of a magnetization pattern resulting from a superposition of the magnetic patterns of FIGS. 4 and 5.

FIG. 7 shows four graphs of sensor signals from four different sensor locations.

FIG. 8 shows two graphs illustrating an effect of torque on the superposed magnetic field pattern of FIG. 6.

FIG. 9 shows a difference curve of the two graphs of FIG. 8.

FIG. 10 shows four graphs of sensor signals from four different sensor locations based on the difference curve of FIG. 9.

Figure 11:
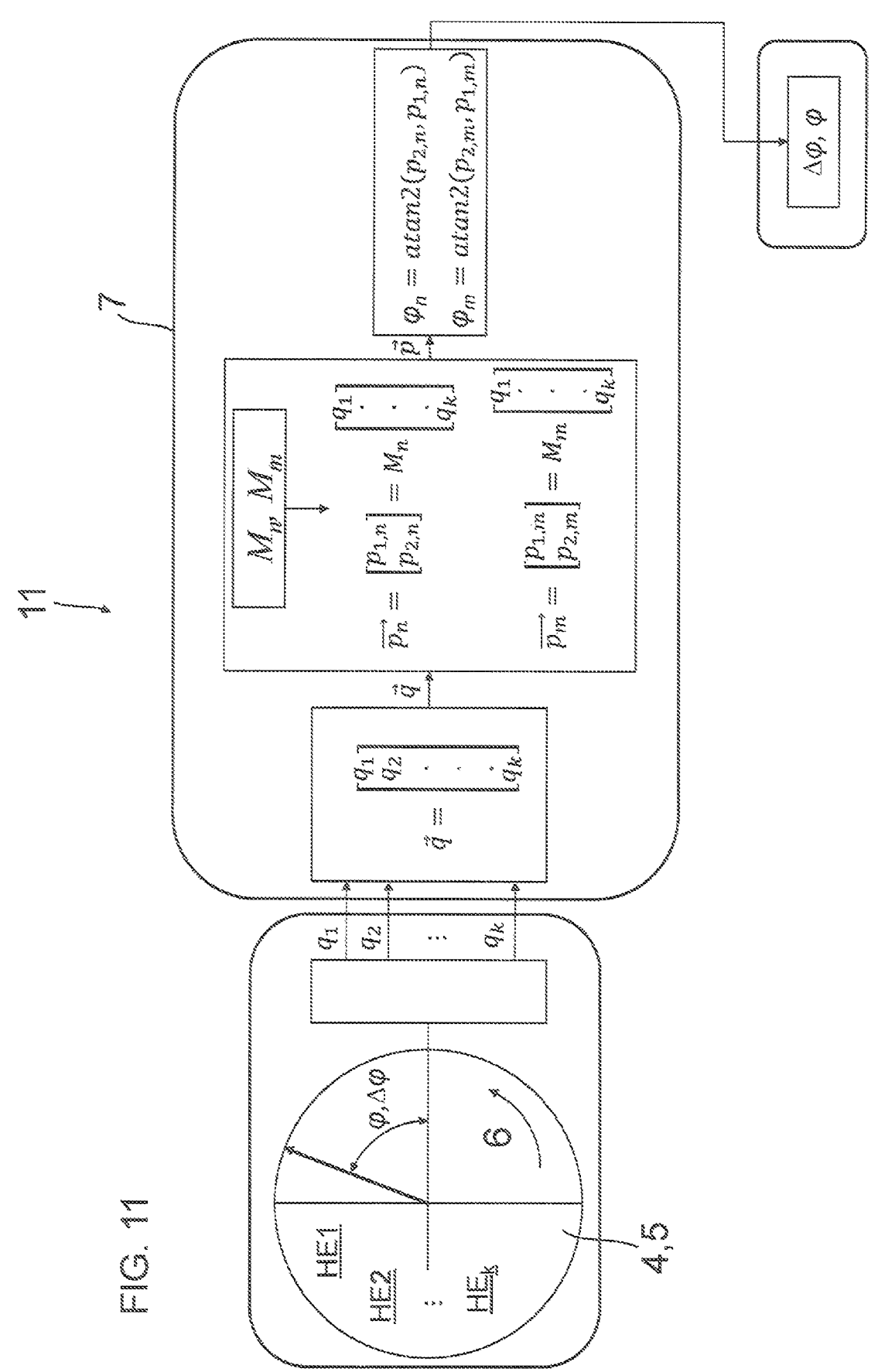

FIG. 11 shows a functional diagram of an exemplary embodiment of a method according to an embodiment.

Figures 12, 13:
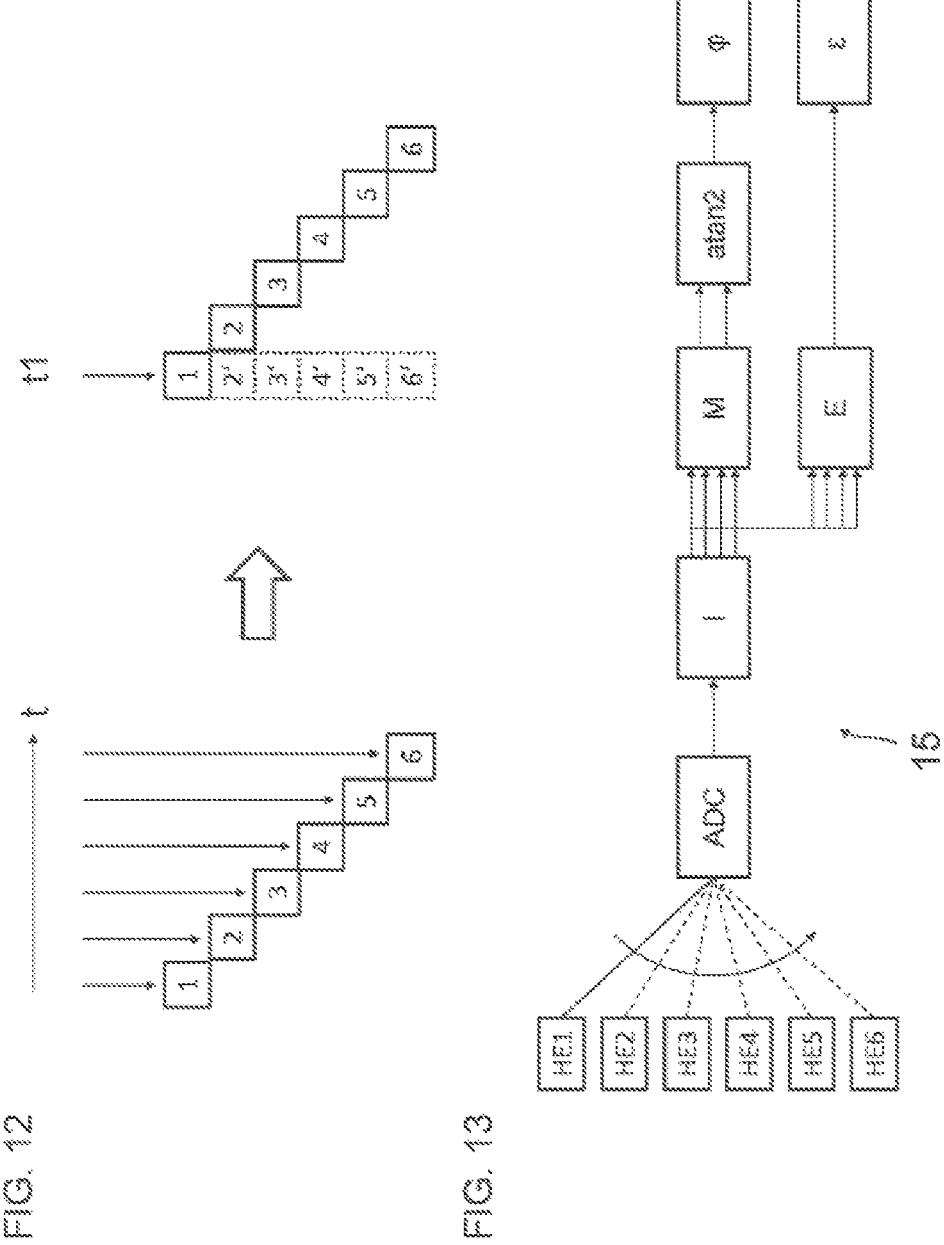

FIG. 12 shows a diagram of an asynchronous detection of measurement values according to a further exemplary embodiment of a method according an embodiment.

FIG. 13 shows a functional diagram of a yet further exemplary embodiment of a method according an embodiment.

In the various figures, equivalent elements with respect to their function are usually provided with the same reference numerals/signs so that these elements are usually described only once.

DETAILED DESCRIPTION OF ILLUSTRATIVE EMBODIMENTS

Various embodiments of the present disclosure will now be described by means of the Figures.

FIG. 1 shows a perspective view of an exemplary embodiment of a sensor device 1 according to an embodiment. FIG. 2 shows a perspective view of a portion of the sensor device 1 of FIG. 1, and FIG. 3 shows a plan view of the sensor device 1 of FIG. 2 in more detail. In the following description, reference will be made in an arbitrary manner to FIGS. 1 to 3.

The sensor device 1 is configured to determine a relative angular position between a first shaft half 2 and a second shaft half 3 of a rotary shaft, e.g., a rotary motor drive shaft such as a drive shaft of an e-bike, however, without necessarily being limited to e-bike applications. As can be seen from FIGS. 1 to 3, the sensor device 1 further comprises a first magnetic structure 4 and a second magnetic structure 5 having spatially different magnetic periodicities (cf. FIGS. 4, 5), wherein the first magnetic structure 4 is mounted on the first shaft half 2 and the second magnetic structure 5 is mounted on the second shaft half 3 such that respective magnetic fields generated and/or influenced by the first and second magnetic structures 4, 5 superpose. Further, the sensor device 1 comprises at least four sensors HE1, HE2, HE3, HE4 mounted stationary with respect to a rotary movement 6 of the rotary shaft such that the superposed magnetic field generated and/or influenced by the first and second magnetic structures 4, 5 is detectable by each of the at least four stationary sensors HE1, HE2, HE3, HE4. The sensor device 1 also comprises an electronic evaluation circuit 7 which is configured to receive measurement values corresponding to the detected superposed magnetic field from each of the at least four sensors HE1, HE2, HE3, HE4 in order to determine the relative angular position from the received measurement values of the at least four sensors HE1, HE2, HE3, HE4.

The sensors HE1, HE2, HE3, HE4 may be mounted on a single printed circuit board 10 (PCB), however, without necessarily being limited thereto. In turn, the PCB 10 may be attached to a stator (e.g., housing, not shown) which accommodates the rotary shaft, i.e., the shaft halves 2 and 3. If a PCB is provided for mounting the sensors HE1, HE2, HE3, HE4, the PCB may advantageously be used to electrically connect (not shown) the sensors HE1, HE2, HE3, HE4 to the evaluation circuit 7, e.g., a microcontroller, a digital signal processor, and the like. The evaluation circuit 7 may be mounted on the same PCB 10 as the sensors HE1, HE2, HE3, HE4, which enables an even more compact and lighter design which provides particular advantage in compact and lightweight (i.e., small-scale) applications such as e-bike applications (e.g., e-bike crankset), for example. It should be noted that other propulsion systems, such as (electric) automotive applications, may also benefit from a compact design and light weight of a sensor device according to the present disclosure, so that these applications are not excluded.

The rotary shaft of the sensor device 1 may comprise a torsion section 8 which elastically interconnects the two shaft halves 2, 3 for torque transmission, as shown in FIG. 1 to 3. The torsion section 8 may be a torsion bar, for example. With a given torsional sensitivity of the torsion section 8, i.e., the torsion angle as a function of the applied mechanical torque, the torque transmitted by the rotary shaft results from the determined relative angular position between the two shaft halves 2, 3 of the rotary shaft.

Furthermore, the evaluation circuit 7 of the sensor device 1 may further be configured to determine an absolute angular position of the rotary shaft in relation to a predetermined rotary reference position from the received measurement values of the at least four sensors HE1, HE2, HE3, HE4. The different magnetic periodicities of the first and second magnetic structures 4, 5 and the detected superposition of the respectively generated and/or influenced magnetic fields at the locations of the sensors HE1, HE2, HE3, HE4 allow unambiguous detection of the absolute angular position (i.e., absolute angle) of rotation of the rotary shaft throughout a full revolution, i.e., 360°.

Furthermore, the arrangement of the least four sensors HE1, HE2, HE3, HE4 of the sensor device 1 may define with respect to the rotary movement 6 of the rotary shaft at least one virtual sensing line 9. A Fourier series of the magnetic field generated and/or influenced by the first magnetic structure 4 along the at least one virtual sensing line 9 preferably contains a first maximum harmonic and a Fourier series of the magnetic field generated and/or influenced by the second magnetic structure 5 along the at least one virtual sensing line 9 preferably contains a second maximum harmonic different from said first maximum harmonic. "First" and "Second" harmonic indicate the association of the respective harmonics with the first and second magnetic structures, respectively. The term "maximum" may refer to a maximum amplitude or maximum spectral weight of the respective harmonics (which correspond to a given number n, m of poles/pole pairs associated with the respective first/second magnetic structure for establishing the magnetic periodicities) within a set of possibly a plurality of detectable harmonics. In principle, any different harmonics (i.e., of higher or lower degree than n or m) may be used, provided that some degradation in the accuracy of the values to be determined and more noise is going to be accepted.

In particular, for the determination of an absolute angular position of the rotary shaft, the first maximum-amplitude harmonic and the second maximum-amplitude harmonic (which correspond to a given number n, m of poles/pole pairs of the first and second magnetic structures for establishing the respective magnetic periodicities) differ such that their degrees are coprime or relative prime integers, i.e., the only positive integer that is a divisor is 1. For example, coprime number pairs n, m may be 3 and 5, 4 and 5, 5 and 7, 7 and 8, 8 and 11, 11 and 13, etc. Then, even if the magnetic periodicity of the individual magnetic structure only allows up to multiples of 360°/n and 360°/m, respectively, an absolute angular position of the rotary shaft with respect to a predetermined rotary reference position can be reliably determined with high accuracy.

The magnetic periodicities of the first magnetic structure 4 and the second magnetic structure 5 along the at least one virtual sensing line 9 are different, which enables determination of the relative angular position and/or transmitted torque between the first and second magnetic structures 4, 5 and/or absolute angular position of the rotary shaft in the accurate manner described herein.

The virtual sensing line 9 may have a substantially circular shape as is shown in FIG. 3. However, other geometric shapes of the virtual sensing line 9 may be considered as well.

In general, the first and second magnetic structures 4, 5 may comprise different pole configurations. For example, the first and second magnetic structures 4, 5 may comprise different numbers of magnets (not shown), e.g., permanent magnets.

The permanent magnets may be arranged according to a Halbach array (not shown).

Advantageously, a number n of poles or pole pairs of the first magnetic structure 4 and a number m of poles or pole pairs of the second magnetic structure 5 may be coprime or relative prime integers, i.e., the only positive integer that is a divisor of the number of poles/pole pairs of the first magnetic structure 4 and the number of poles/pole pairs of the second magnetic structure 5 is 1. This configuration may be used to particular advantage for determining an absolute angular position of the rotary shaft with respect to a predetermined rotary reference position, even if the magnetic periodicity of the individual magnetic structure 4, 5 only allows up to multiples of 360°/n and 360°/m, respectively.

Furthermore, the at least four sensors HE1, HE2, HE3, HE4 may be spaced apart from each other with respect to the rotary movement 6 of the magnetic structures 4, 5 at intervals different from the magnetic periodicity of the first and/or second magnetic structure(s) 4, 5 or a rational number thereof, as is shown in FIG. 3. In such a configuration, the at least four stationary sensors HE1, HE2, HE3, HE4 are not mounted at locations coinciding with the n- and m-polar rotational symmetry of the magnetic structures 4, 5, i.e., are not placed with angular intervals of $k \cdot 2\pi/n$ or $j \cdot 2\pi/m$, ($k=1, \ldots, n-1, j=1, \ldots, m-1$, wherein n=number of poles/pole pairs of the first magnetic structure, and m=number of poles/pairs of the second magnetic structure).

For example, the locations of the individual sensors HE1, HE2, HE3, HE4 along the virtual sensing line 9, as shown in FIG. 3, may be chosen such that the sensors HE1, HE2, HE3, HE4 probe different parts of each contributing magnetic field, i.e., the superposed magnetic field at the locations of the sensors HE1, HE2, HE3, HE4. The sensors HE1, HE2, HE3, HE4 may be placed at angles $j \cdot 360/p$ with respect to the rotary movement 6, for j=0, 1, 2, 3, where p may be relative prime to n and m.

It is to be noted that the sensors device 1 illustrated in FIG. 1 to 3 is not limited in number to the depicted four sensors HE1, HE2, HE3, HE4. The sensor device 1 may comprise more than four sensors. For example, if five sensors (not shown) are used, the evaluation circuit 7 may further be configured to receive at least five sensor signals and to determine the relative angular position, or the torque, or the absolute angular position, or any combination thereof, by calculating a subspace of the sensor signals that is immune to external magnetic fields.

For example, the sensor device 1 may comprise five or six sensors to detect the superposed magnetic field in a same spatial axis, or may comprise six or seven sensors to detect the superposed magnetic field in two different directions within a same plane, or may comprise seven or eight sensors are provided to detect the superposed magnetic field in three different spatial directions.

In general, the sensors HE1, HE2, HE3, HE4 may be configured to detect an arbitrary field component of the superposed magnetic field.

Additionally, or alternatively, at least some of the at least four sensors HE1, HE2, HE3, HE4 may be configured to detect a field gradient of the superposed magnetic field in an arbitrary spatial direction, for example, in the direction of the rotary movement 6.

All or some of the sensors HE1, HE2, HE3, HE4 may detect the superposed magnetic field in the same spatial direction, i.e., detect a same field component or field gradient of the superposed magnetic field, e.g., in the direction of rotation 6 of the rotary shaft.

At least some of the sensors may be configured to detect the superposed magnetic field in different directions, i.e., detect different field components or field gradients of the superposed magnetic field, e.g., in the radial and/or the axial and/or the tangential direction with respect to the rotary movement 6 of the rotary shaft.

Furthermore, at least two of the at least four sensors may be arranged virtually at a same location or in a same packaging (not shown).

In the exemplary sensor device 1 shown in FIG. 2, the sensors HE1, HE2, HE3, HE4 are at least partially surrounded by the magnetic structures 4, 5. In the shown sensor device, the sensors HE1, HE2, HE3, HE4 are arranged in a mirror or symmetry plane between the first and second magnetic structures 4, 5, i.e., they are interposed in a space between the two opposing magnetic structures 4, 5 such that at least two sides or side faces of the sensors HE1, HE2, HE3, HE4 and the magnetic structures 4, 5, stand vis-à-vis.

However, the sensors HE1, HE2, HE3, HE4 may also be arranged laterally of the magnetic structures 4, 5 (not shown).

FIG. 4 shows a graph of an exemplary first magnetization pattern of a magnetic structure, for example, the first magnetic structure 4 of the sensor device 1 shown in FIG. 1 to 3. FIG. 5 shows a graph of an exemplary second magnetization pattern of a magnetic structure, for example, the second magnetic structure 5 of the sensor device 1 shown in FIG. 1 to 3.

As shown in FIGS. 4 and 5, the two magnetic patterns differ in terms of their number of poles/pole pairs, n and m, respectively. In the present case, n and m are relative prime integers.

In this way, the absolute angular position of the rotary shaft can be determined by a generalization of the nonius principle (Vernier scale), even if each individual pattern only allows up to multiples of 360°/n and 360°/m, respectively. For example, the graph shown in FIG. 4 is based on n=3, and m=5 in FIG. 5.

FIG. 6 shows a graph of a magnetization pattern resulting from a superposition of the magnetic patterns of FIGS. 4 and 5. The superposed magnetization pattern is the basis for a full discrimination of relative angle (incl. torque) between the shaft halves 2, 3 and absolute angular position of the rotary shaft.

FIG. 7 shows four graphs of sensor signals from four different sensor locations of the sensors HE1, HE2, HE3, HE4. The superposed magnetic field is detected at four different locations along the virtual sensing line 9 (only 180° shown in FIG. 7). At each angular position, the signal pattern allows for a unique determination of the angles of both field configurations contributing to the superposition. The vertical bars highlight the actual measurement values for an absolute shaft angle of 30° and 110°, respectively.

FIG. 8 shows two graphs illustrating an effect of torque on the superposed magnetic field pattern of FIG. 6. The graph shows the magnetic field pattern at a single sensor position for a full revolution of the rotary shaft, corresponding to two different values of the applied torque, namely torque T=0 and torque T>0. The difference between the two graphs is due to the relative motion between the first and second magnetic structures 4, 5.

FIG. 9 shows a difference curve of the two graphs of FIG. 8, i.e., the two different torque states (again for a full rotation of the rotary shaft).

FIG. 10 shows four graphs of sensor signals from four different sensor locations of the sensors HE1, HE2, HE3, HE4 based on the difference curve of FIG. 9, i.e., two different torque states T=0 and T>0. The shown signal patterns at four positions together allow for a unique determination of the applied torque as well as the absolute angular position of the rotary shaft. The vertical bars highlight the signal differences for the absolute angular position of the rotary shaft at 30° and 110°.

FIG. 11 shows a functional diagram of an exemplary embodiment of a method according to an embodiment. The method is configured to determine a relative angular position and, if applicable, also an absolute angular position, $\Delta\varphi$ and $\varphi$, respectively, between a first shaft half and a second shaft half of a rotary shaft such as the first and second shaft halves 2, 3 of the sensor device 1 shown in FIGS. 1 to 3, for example.

After providing a first magnetic structure, e.g., the first magnetic structure 4, and a second magnetic structure, e.g., the second magnetic structure 5, having spatially different magnetic periodicities, and after mounting the first magnetic structure 4 on the first shaft half 2 and mounting the second magnetic structure 5 on the second shaft half 3 such that respective magnetic fields generated and/or influenced by the first and second magnetic structures 4, 5 superpose, and providing at least four sensors, e.g., the sensors HE1, HE2, HE3, HE4, mounted stationary with respect to a rotary movement of the rotary shaft such that the superposed magnetic field generated and/or influenced by the first and second magnetic structures 4, 5 is detected by each of the at least four stationary sensors HE1, HE2, HE3, HE4, measurement values q corresponding to the detected superposed magnetic field from each of the at least four sensors HE1, HE2, HE3, HE4 are received, for example, by an electronic evaluation (e.g., signal processing) circuit 7, and from the received measurement values q of the at least four sensors HE1, HE2, HE3, HE4 the relative angular position $\Delta\varphi$ and, if applicable, the absolute angular position $\varphi$ is determined.

In the example shown in FIG. 11, all sensor elements detect the superposed magnetic field at their respective location instantaneously to provide a vector $\vec{q}$. Therefore, all measurement values q rerefer to the same point in time and may—without necessarily being limited thereto—be processed synchronously, e.g., using a parallel ADC which converts a plurality of the analog sensor values to respective digital values for further processing as depicted in FIG. 11. Then, two 2-vectors $p_n = M_n q$ and $p_m = M_m q$ (by two matrix vector multiplications) are evaluated and subject to the atan2 function to provide the subrange-angles $\varphi_n = \text{atan2}(p_{n,y}, p_{n,x})$ and $\varphi_m = \text{atan2}(p_{m,y}, p_{m,x})$.

With the subrange-angles $\varphi_n$, $\Delta\varphi$ and $\varphi$ are evaluated according to:

$$a. \Delta\varphi = s1 - 2\pi \cdot \text{round}(s_2/2\pi)/(m \cdot n), \text{ with } s_1 = \varphi_m/m - \varphi_n/n$$
$$\text{and } s_2 = n \cdot \varphi_m - m \cdot \varphi_n$$

$$b. \varphi = d_n \cdot \varphi_n + d_m \cdot \varphi_m - f \cdot \Delta\varphi, \text{ with } 2 \cdot f = d_m \cdot m - d_n \cdot n, \text{ where}$$
$$d_n, d_m \text{ fulfill } d_n \cdot n + d_m \cdot m = 1 \qquad \text{(Bézout's identity)}$$

The quantity $\Delta\varphi = \alpha \cdot T$ is directly proportional to the applied torque T, while $\varphi$ is the angular position of the rotary shaft.

It should be clear from the above that the determination of the relative angular position $\Delta\varphi$, or torque T, or absolute angular position $\varphi$ according to an embodiment is based on a multiplication between the received measurement values q and the predetermined signal model matrix M representative of the measurement process of the dynamic physical system, i.e., the components of the sensor device 1 including the magnetic structures 4, 5, magnets/coils (not shown), sensors HE1, HE2, HE3, HE4, their actual physical arrangement and relative positions to each other etc., on the relative angular position $\Delta\varphi$, and torque T, and absolute angular position $\varphi$, respectively.

The model matrix M comprises row and column entries, wherein each row relates to the sense signal of one sensor HE1, HE2, HE3, HE4 etc. (i.e., the number of rows may equal the total number of different sensors) and the corresponding row entries may refer to components of considered harmonics. From information gathered at the calibration phase of the sensor device 1, the model matrix M and the characteristics of (possibly present) higher harmonics may be identified.

In general, the method according to an embodiment processes the sensor signal information in a multidimensional space determined by the number of sensors. In this way, all sensor information is maintained while an analysis framework to determine the relative angular position, the torque, or the absolute angular position, or any combination thereof, is provided. In such a multidimensional space, since no information is lost, all correlations and redundancy can be used for other features like error measurement, stray field immunity, fault detection and calibration.

A space orthogonal to the position information in the multidimensional space may be used to determine the angular error by determining a difference between a measured path and a norm path. Using a calibrated matrix M, the signal path is projected to obtain the output angle in position space independent of the sensor arrangement.

When mechanical wear or any other deterioration occurs in the arrangement of the shaft halves of the rotary shaft, a deviation from the ideal curve will raise in the multidimensional path. An error signal will be generated as a function of the angle, indicative of the deviation with respect to the ideal path. This error signal is not equivalent to the angular error at a given output angle, but the signature of the error signal can lead to the error source. This deviation will translate in an output angle including an error induced from the non-ideal signals.

FIG. 12 shows a diagram of an asynchronous detection of measurement values according to a further exemplary embodiment of a method according to an embodiment. In the example shown in FIG. 12, six measurement values (indicated in FIG. 12 with respective numerals "1" to "6") are generated consecutively in time t. The asynchronously generated measurement values are then calculated back to a common point in time by interpolation prior to determining the relative angular position, or the torque, or the absolute angular position, or any combination thereof. In the present example, the measurement values 2, 3, 4, 5, and 6 are backdated (indicated in FIG. 12 with respective numerals "2'" to "6'") to a common time instant such as the measurement instant t1 of the first sensor HE1, for example. The interpolation may be based on the application of an FIR filter, for example.

The asynchronously obtained measurement values in combination with the interpolation combines a high dynamic performance (i.e., high update rate during fast rotations, for example) with high precision.

FIG. 13 shows a functional diagram of a yet further exemplary embodiment of a method 15 according to an embodiment. As shown in FIG. 13, six sensors HE1, HE2, HE3, HE4, HE5, and HE6 are provided, like in the example shown in FIG. 12. As shown in FIG. 13, the sensors HE1, HE2, HE3, HE4, HE5, HE6 are asynchronously generating measurement values, i.e., non-simultaneously. Furthermore, a multiplexed ADC is used to convert the consecutively input analog measurement values to respective digital values. The digital measurement values are fed to an interpolator, e.g., a linear interpolator, which backdates the measurement values of the sensors HE1, HE2, HE3, HE4, HE5, HE6 to a common time instant, e.g., the time instant t1 as shown in FIG. 12. Using the calibrated signal model matrix M, the angular information, i.e., the relative angular position $\Delta\varphi$ between the shaft halves 2, 3 (cf. FIG. 1) of the rotary shaft and, if applicable, the absolute angular position φ of the rotary shaft, may be determined essentially as illustrated in FIG. 11. To this end, the determination of the angular and/or torque information is based on a multiplication between the received measurement values q from the sensors HE1, HE2, HE3, HE4, HE5, HE6 and the predetermined signal model matrix M representative of the measurement process of the sensor device 15 on the relative angular position Δφ, and torque T, and absolute angular position φ, respectively. The model matrix M describes the sensing/measuring process of the underlying dynamic physical system, i.e., the components of the sensor device 1 such as the magnetic structures 3, 4, mounting/positioning of magnets/coils (not shown), mounting/positioning of the sensors HE1, HE2, HE3, HE4, HE5, HE6 etc. Additionally, in the case shown in FIG. 13, also an error information ε is determined using an error matrix E. The error information ε is determined based on a multiplication between the received measurement values and the predetermined coefficient matrix E representative of the error on the determined relative angular position Δφ, or torque T, or absolute angular position φ, or any combination thereof.

It is to be noted that the sensor device 15 shown in FIG. 13 is not necessarily limited to the depicted asynchronous sensor input although this approach is particularly preferred. Sensor device 15 may also be combined with a synchronous (i.e., simultaneous) input of the sensor measurement values q as shown in FIG. 11.

While the disclosed embodiments have been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure, and the appended claims. In the claims, the word "comprising" does not exclude other elements or steps, and the indefinite article "a" or "an" does not exclude a plurality of elements or steps. The mere fact that certain measures are recited in different dependent claims does not indicate that a combination of these measures cannot be used to advantage.

Any reference signs in the claims should not be construed as limiting the scope thereof.

What is claimed is:

1. A sensor device for determining a relative angular position between a first shaft half and a second shaft half of a rotary shaft, in particular a rotary motor drive shaft, the sensor device comprising:

a torsion section elastically interconnecting the first shaft half and the second shaft half for a torque transmission, a first magnetic structure and a second magnetic structure having spatially different magnetic periodicities, wherein the first magnetic structure is mounted on the first shaft half and the second magnetic structure is mounted on the second shaft half such that respective magnetic fields generated and/or influenced by the first magnetic structure and the second magnetic structure superpose, at least four sensors mounted stationary with respect to a rotary movement of the rotary shaft such that the superposed magnetic field generated and/or influenced by the first magnetic structure and the second magnetic structure is detectable by each of the at least four stationary sensors, and an electronic evaluation circuit configured to receive measurement values corresponding to the detected superposed magnetic field from each of the at least four sensors in order to determine the relative angular position from the received measurement values of the at least four sensors, wherein the electronic evaluation circuit is further configured to determine an absolute angular position of the rotary shaft in relation to a predetermined rotary reference position from the received measurement values of the at least four sensors.

2. The sensor device according to claim 1, wherein the at least four sensors mounted stationary with respect to the rotary movement of the rotary shaft define at least one virtual sensing line with respect to said rotary movement, and wherein a Fourier series of the magnetic field generated and/or influenced by the first magnetic structure along said at least one virtual sensing line contains at least a first maximum harmonic and a Fourier series of the magnetic field generated and/or influenced by the second magnetic structure along said at least one virtual sensing line contains at least a second maximum harmonic different from said first maximum harmonic.

3. The sensor device according to claim 1, wherein the evaluation circuit is further configured to determine the relative angular position, a torque, or an absolute angular position based on a multiplication between the received measurement values and a predetermined signal model matrix representative of the measurement process of the sensor device on the relative angular position, the torque, and the absolute angular position, respectively.

4. The sensor device according to claim 1, wherein the evaluation circuit is further configured to determine an error signal based on a multiplication between the received measurement values and a predetermined coefficient matrix representative of an error on at least one of: the determined relative angular position, a torque, and an absolute angular position.

5. The sensor device according to claim 1, wherein the evaluation circuit is further configured to receive at least five sensor signals and to determine at least one of: the relative angular position, or a torque, and an absolute angular position by calculating a subspace of the at least five sensor signals that is immune to external magnetic fields.

6. The sensor device according to claim 1, wherein five or six sensors are provided to detect the superposed magnetic field in a same spatial axis.

7. The sensor device according to claim 1, wherein at least two of the at least four sensors are arranged virtually at a same location or in a same packaging.

8. The sensor device according to claim 1, wherein at least two of the at least four sensors are configured to detect the superposed magnetic field in different directions.

9. The sensor device according to claim 1, wherein at least two of the at least four sensors are at least partially surrounded by the first magnetic structure and the second magnetic structure or arranged laterally of the first magnetic structure and the second magnetic structure.

10. The sensor device according to claim 1, wherein six or seven sensors are provided to detect the superposed magnetic field in two different directions within a same plane.

11. The sensor device according to claim 1, wherein seven or eight sensors are provided to detect the superposed magnetic field in three different spatial directions.

12. A method for determining a relative angular position between a first shaft half and a second shaft half of a rotary shaft, in particular a rotary motor drive shaft, the method comprising the steps of:

transmitting between the first shaft half and the second shaft half via a torsion section which interconnects the first shaft half and the second shaft half to one another in an elastic manner, providing a first magnetic structure and a second magnetic structure having spatially different magnetic periodicities, wherein the first magnetic structure is mounted on the first shaft half and the second magnetic structure is mounted on the second shaft half such that respective magnetic fields generated and/or influenced by the first magnetic structure and the second magnetic structure superpose, providing at least four sensors mounted stationary with respect to a rotary movement of the rotary shaft such that the superposed magnetic field generated and/or influenced by the first magnetic structure and the second magnetic structure is detected by each of the at least four stationary sensors, and, by an electronic evaluation circuit, receiving measurement values corresponding to the detected superposed magnetic field from each of the at least four sensors, determining the relative angular position from the received measurement values of the at least four sensors, and determining an absolute angular position of the rotary shaft in relation to a predetermined rotary reference position from the received measurement values of the at least four sensors.

13. The method according to claim 12, wherein the at least four sensors mounted stationary with respect to the rotary movement of the rotary shaft are mounted such that they define at least one virtual sensing line with respect to said rotary movement, and wherein a Fourier series of the magnetic field generated by the first magnetic structure along said at least one virtual sensing line contains at least a first maximum harmonic and a Fourier series of the magnetic field generated by the second magnetic structure along said at least one virtual sensing line contains at least a second maximum harmonic different from said first maximum harmonic.

14. The method according to claim 12, wherein the superposed magnetic field is detected by the at least four sensors asynchronously, resulting in asynchronous measurement values, which are calculated back to a common point in time by interpolation prior to determining at least one of: the relative angular position, a torque, and the absolute angular position.

* * * * *